March 2, 1926.
E. R. HODGMAN
WRINGER MOUNTING AND CONTROL DEVICE
Filed March 19, 1925    2 Sheets-Sheet 1
1,574,817
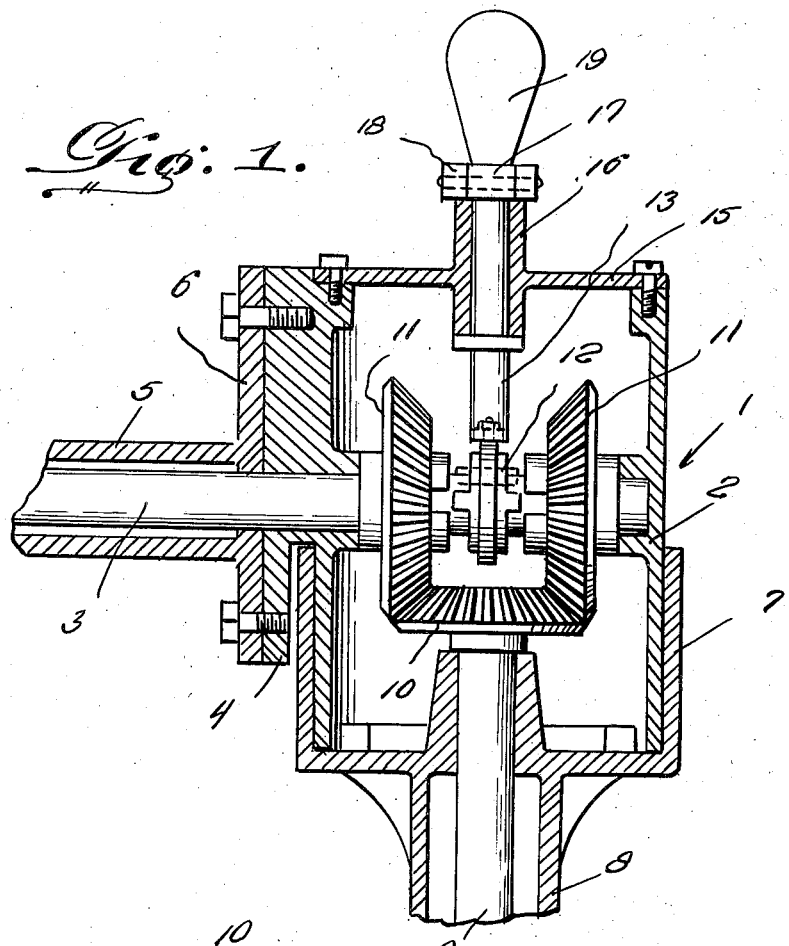
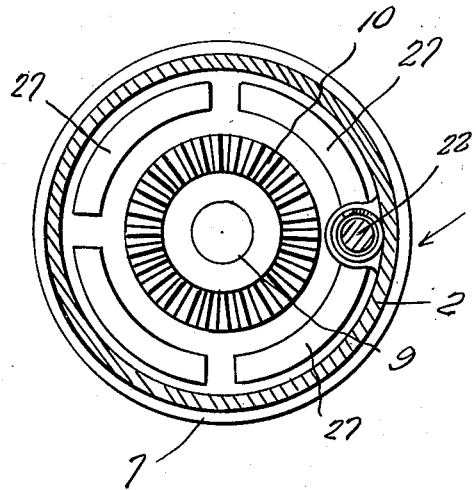
Inventor
E. R. Hodgman,
By Clarence O'Brien
Attorney

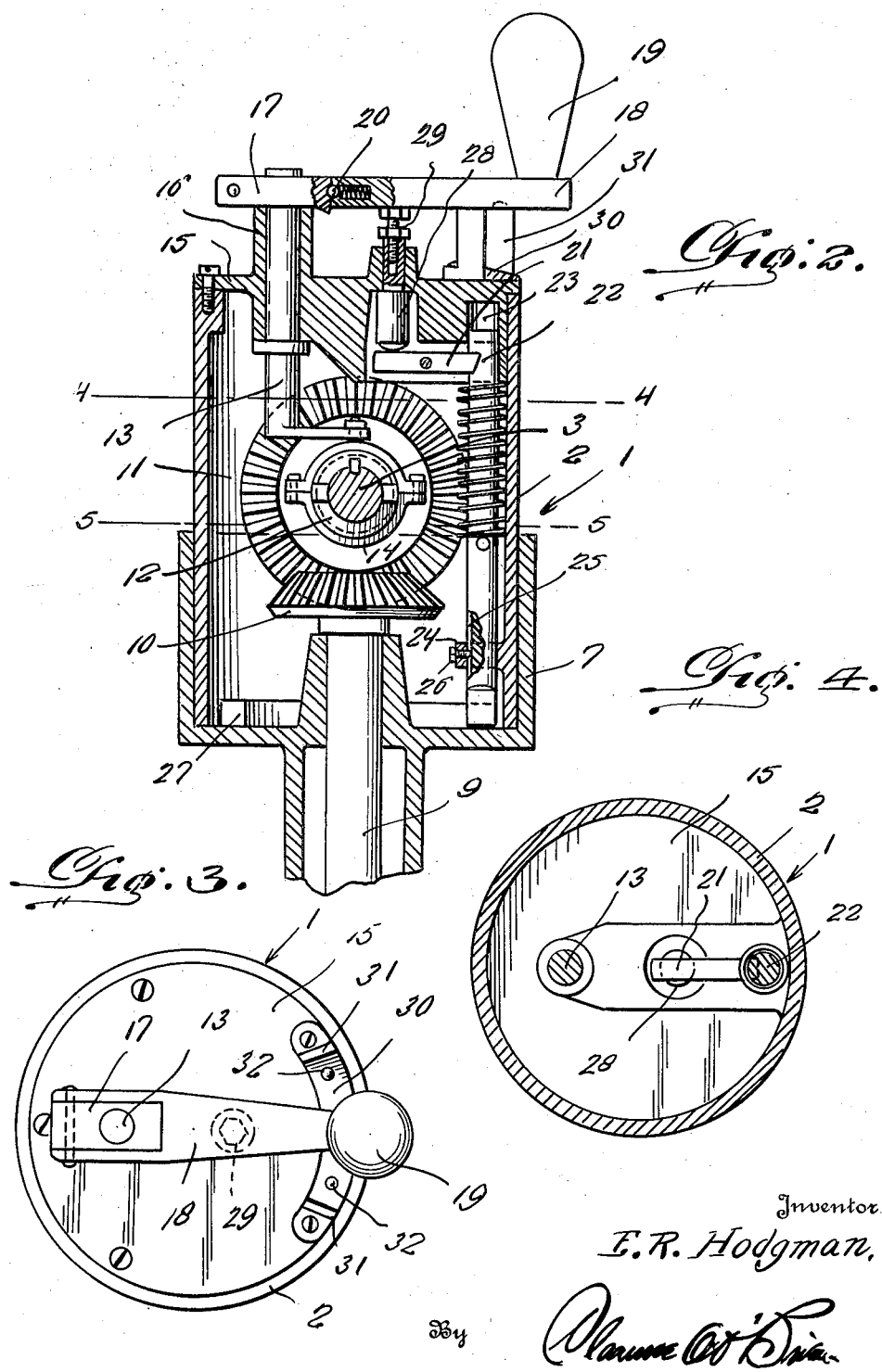

Patented Mar. 2, 1926.

1,574,817

UNITED STATES PATENT OFFICE.

EDWARD R. HODGMAN, OF DWIGHT, ILLINOIS.

WRINGER MOUNTING AND CONTROL DEVICE.

Application filed March 19, 1925. Serial No. 16,718.

*To all whom it may concern:*

Be it known that I, EDWARD R. HODGMAN, a citizen of the United States, residing at Dwight, in the county of Livingston and State of Illinois, have invented certain new and useful Improvements in a Wringer Mounting and Control Device, of which the following is a specification.

This invention relates to an improved mounting for a clothes wringer such as is used in connection with power operated clothes washing machines, and also has reference to a novel control and locking device for moving the mounting to various positions and positively retaining the same in said positions.

More particularly, I have evolved and produced a rotatable mounting functioning additionally as a gear casing, and support for the wringer operating shaft.

An important advantage is derived from the incorporation in the structure of a spring pressed locking member which is cooperable with a relatively stationary part for positively holding the mounting in any one of four positions, thus permitting the mounting to be released and turned through approximate quarter turns to carry the wringer rolls to any one of these four selected positions.

It is also a very important object and advantage to provide a clutch operating means which is under control of a handle which is so mounted as to permit it to serve additionally for rotating the mounting to its various positions.

The invention also embodies numerous other advantageous details and characteristic features and these will be made more apparent as the description continues.

Referring to the accompanying drawings it will be seen that:

Figure 1 is a central vertical section through the device with certain of the details appearing in elevation.

Figure 2 is a similar view taken at an approximate right angle to Figure 1.

Figure 3 is a top plan view of the device.

Figures 4 and 5 are horizontal sections taken upon the planes of the lines 4—4 and 5—5 respectively of Figure 2.

Referring to the drawings in detail, it will be seen that the mounting is indicated, in a general way, by the reference character 1. This mounting preferably comprises a cylinder which is open at its opposite ends and provided between its top and bottom with internal diametrically opposite bearings to rotatably receive the wringer shaft 3. Upon that side through and beyond which the wringer shaft extends, a clamping plate 4 is formed and the shaft housing 5 is provided with a flange 6 which is bolted or otherwise detachably connected to said plate. The cylinder 2 has its lower end mounted for rotation within a cup 7 on the upper end of a relatively stationary support 8. The drive shaft 9 is mounted for rotation upon the support and is provided upon its upper end with a beveled pinion 10 meshing with the beveled gears 11 slidably keyed upon the wringer shaft 3. Interposed between the gears 11 and slidable upon the shaft 3 is a clutch 12 adapted to be operated by the oscillatory rod 13. This rod is provided with a laterally directed lower end which is connected with the clutch ring 14 in any suitable manner.

A removable cover plate 15 serves to close the upper open top of the cylinder and this cover plate is provided with an eccentrically located bearing 16 for the oscillatory rod 13. The rod in turn is provided at its upper end with a block 17 forming a pivotal mounting for the bifurcated end of a clutch operating handle or lever 18. This handle is provided at its free end with an operating knob 19. It will be noted from Figure 2 that the handle is provided with a spring pressed ball 20 adapted to be seated in a socket in the head 17 to maintain the handle in the operative position shown in the figures last named. From Figure 2 it will also be seen that this cover plate is provided upon its under side with a protuberance which is recessed to accommodate a pivoted arm 21, this arm being connected with a spring returned latch bolt 22 vertically slidable within said cylinder. The upper end of this bolt is receivable in a socket 23 in the under side of the cover and an appropriate guide 24 is cast upon the wall of the cylinder adjacent the bottom, the bolt sliding therethrough and being provided with a groove 25 in which a set screw 26 extends. The lower end of this latch bolt is adapted to be pressed by the spring into the keeper openings formed between the spaced segments 27 provided upon the bottom of the aforesaid cup 7. There are four of these segments and the adjacent end of each are spaced apart to provide four keeper seats in which the locking bolt may be selectively seated so that the entire cylinder can be bodily rotated through a quarter or complete revolution to change the position of the wringer (not shown).

It will be noted that means is provided for operating the latch bolt from the handle 18. The means preferably comprises a sliding pin 28 (see Figure 2) having an adjusting screw 29 upon which the handle rests. The lower end of the pin 29 rests upon the aforesaid arm 21 and it is obvious that by depressing the pin, the arm will be rocked upon its pivot to retract the locking bolt 22.

Observing Figure 3 it will be seen that a quadrant 30 is screwed or otherwise permanently fastened on top of the removable cover. This quadrant being provided at its opposite end with upstanding lugs 31 serving as stops to limit the swing of the handle in opposite directions. Any suitable means such as a spring pressed pin 32 may be provided upon the quadrant for holding the handle in either position. It is of course, normally in neutral position.

From the foregoing description and drawing, it will be seen that it is impossible, so long as the wringer rolls are in rotation, to shift or change the position of the wringer by turning the cylinder, in order that the cylinder may be turned within the cup, it is necessary to press the handle down when it is overtop of the sliding pin 28. By thus pressing it downwardly, the arm 21 is rocked about its pivot and the latch bolt 22 is moved vertically against the tension of the spring, thus the lower end is lifted sufficiently to clear the adjacent segment 27 and the cylinder can be turned to any one of the four positions. Upon reaching the next keeper seat, and assuming that the handle has been released, it will be seen that the latch bolt will automatically drop down into that seat. During the quarter turn made, the latch bolt will ride upon the segments and will be held in retracted position, but immediately upon reaching the next seat it will drop into the same to lock the casing against further rotation. Of course, by maintaining a downward pressure upon the handle, the latch bolt can be held retracted and it will not drop into the next seat. In order to permit releasing of the latch it is essential that the handle be in neutral position. Consequently, it will be seen that the mounting cannot be turned while the wringer rolls are in motion. This is indeed an important safety feature. The same handle which serves to operate the latch bolt also serves to shift the clutch to bring either one of the gears 11 into rotation.

It is thought that the foregoing description taken in connection with the accompanying drawing will enable persons skilled in the art to which the invention relates to obtain a clear understanding of the same. For this reason a more lengthy description is deemed unnecessary.

While the preferred embodiment of the invention has been shown and described it is to be understood that minor changes coming within the field of invention claimed may be resorted to if desired.

Having thus described the invention what I claim as new is:—

1. In a structure of the class described, a relatively stationary support having a cup at its top, a vertical shaft provided with a pinion located in said cup, a cylinder rotatably mounted in said cup, said cup being provided with circumferentially spaced segments spaced apart to provide a plurality of keeper seats, a driven shaft journaled in a bearing in said cylinder, gears on said shaft cooperable with said pinion, and a clutch for connecting said gears with the driven shaft, an oscillatory member for operating said clutch, said member being carried by said cylinder, a horizontal handle for said operating member, a spring pressed latch bolt carried by said cylinder, and having its lower end normally positioned in one of said seats, means for lifting said bolt to disengage it from said seat, said means comprising a pivotally mounted lever, and a reciprocatory member, said reciprocatory member being adapted to be depressed by said handle when it is in a position to dispose said clutch in neutral condition.

2. In a structure of the class described, a relatively stationary support provided with a cup at its top, circumferentially spaced segments carried by the bottom of said cup and providing a plurality of keeper seats, a shaft mounted for rotation upon said support, a pinion carried by said shaft and located in said cup, an open ended cylinder mounted for rotation in said cup, a cover plate carried by said cylinder, a driven shaft mounted in bearings in said cylinder, gears on said shaft engageable with said pinion, a clutch for connecting said gears to said driven shaft, an oscillatory operating member for said clutch journaled for oscillation in said cover plate, a handle carried by said member, spaced stops on said cover plate with which said handle is engageable, a spring pressed latch bolt slidably mounted in said cylinder and engageable with the aforesaid seats, a lever pivoted upon said cover plate and engageable at one end with said bolt, a depressible actuator engageable with the opposite end of the lever and embodying a portion projecting above said cover plate to permit it to be engaged by said handle when the latter is in a neutral state between said stops.

In testimony whereof I affix my signature.

EDWARD R. HODGMAN.